(12) United States Patent
Oh et al.

(10) Patent No.: US 11,970,616 B2
(45) Date of Patent: Apr. 30, 2024

(54) MODIFIED CONJUGATED DIENE-BASED POLYMER AND RUBBER COMPOSITION COMPRISING SAME

(71) Applicant: LG Chem, Ltd., Seoul (KR)

(72) Inventors: Kyoung Hwan Oh, Daejeon (KR); Hyo Jin Bae, Daejeon (KR); Hyun Woong Park, Daejeon (KR); Jeong Heon Ahn, Daejeon (KR); Jae Hyeong Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 334 days.

(21) Appl. No.: 17/297,099

(22) PCT Filed: Dec. 20, 2019

(86) PCT No.: PCT/KR2019/018258
§ 371 (c)(1),
(2) Date: May 26, 2021

(87) PCT Pub. No.: WO2020/130740
PCT Pub. Date: Jun. 25, 2020

(65) Prior Publication Data
US 2022/0010105 A1    Jan. 13, 2022

(30) Foreign Application Priority Data
Dec. 21, 2018 (KR) ........................ 10-2018-0167687

(51) Int. Cl.
*C08K 3/06* (2006.01)
*C08K 3/16* (2006.01)
*C08K 5/5333* (2006.01)
*C08L 9/00* (2006.01)

(52) U.S. Cl.
CPC ............... *C08L 9/00* (2013.01); *C08K 3/06* (2013.01); *C08K 3/16* (2013.01); *C08K 5/5333* (2013.01)

(58) Field of Classification Search
CPC .... C08L 9/00; C08K 3/06; C08K 3/16; C08K 5/5333
See application file for complete search history.

(56) References Cited

U.S. PATENT DOCUMENTS

| | | | |
|---|---|---|---|
| 4,485,833 A | 12/1984 | Uraneck et al. | |
| 5,567,784 A * | 10/1996 | Wieder | C08C 2/00 526/164 |
| 9,822,195 B2 | 11/2017 | Ruehmer et al. | |
| 9,963,519 B2 | 5/2018 | Kloppenburg et al. | |
| 2001/0014720 A1 | 8/2001 | Giebeler et al. | |
| 2002/0173606 A1 | 11/2002 | Kwag et al. | |
| 2008/0114137 A1* | 5/2008 | Kim | C08F 136/04 526/173 |
| 2009/0156751 A1 | 6/2009 | Kwag et al. | |
| 2011/0092646 A1 | 4/2011 | Hamann et al. | |
| 2015/0210791 A1 | 7/2015 | Ruehmer et al. | |
| 2015/0252126 A1* | 9/2015 | Kloppenburg | C08F 136/06 |
| 2016/0257770 A1 | 9/2016 | Kloppenburg et al. | |
| 2016/0280815 A1 | 9/2016 | Kloppenburg et al. | |
| 2017/0183424 A1 | 6/2017 | Kloppenburg et al. | |
| 2017/0267800 A1 | 9/2017 | Tajima | |
| 2018/0037682 A1 | 2/2018 | Ruehmer et al. | |
| 2018/0251628 A1 | 9/2018 | Sugawara | |
| 2018/0312669 A1 | 11/2018 | Kang et al. | |
| 2018/0346616 A1 | 12/2018 | Oh et al. | |
| 2020/0010596 A1 | 1/2020 | Kim et al. | |
| 2020/0270378 A1 | 8/2020 | Kang et al. | |

FOREIGN PATENT DOCUMENTS

| | | | |
|---|---|---|---|
| CN | 1309140 A | 8/2001 | |
| CN | 104136238 A | 11/2014 | |
| CN | 104395351 A | 3/2015 | |
| CN | 105764928 A | 7/2016 | |
| CN | 108368196 A | 8/2018 | |
| CN | 108884271 A | 11/2018 | |
| JP | 2001261683 A | 9/2001 | |
| JP | 2009132907 A | 6/2009 | |
| JP | 2009144154 A | 7/2009 | |
| JP | 2015524018 A | 8/2015 | |
| JP | 2016534170 A | 11/2016 | |
| JP | 2016535130 A | 11/2016 | |
| KR | 20010078117 A | 8/2001 | |
| KR | 20040013253 A | 2/2004 | |
| KR | 20080043639 A | 5/2008 | |
| KR | 20080048832 A | 6/2008 | |
| KR | 20120078625 A * | 7/2012 | ............ C08F 236/10 |
| KR | 20120078625 A | 7/2012 | |
| KR | 20150022836 A | 3/2015 | |
| KR | 20160073924 A | 6/2016 | |
| KR | 20160079810 A | 7/2016 | |
| KR | 20160079811 A | 7/2016 | |
| KR | 20170056569 A | 5/2017 | |
| KR | 101830492 B1 | 2/2018 | |
| WO | 2017047571 A1 | 3/2017 | |

OTHER PUBLICATIONS

KR20120078625A English translation (Year: 2012).*
Extended European Search Report for EP Application No. 19898705 dated Nov. 3, 2021, 2 pgs.
International Search Report for Application No. PCT/KR2019/018258, dated Apr. 2, 2020, 3 pages.

* cited by examiner

Primary Examiner — Catherine S Branch
Assistant Examiner — Huihong Qiao
(74) Attorney, Agent, or Firm — Lerner David LLP

(57) ABSTRACT

A modified conjugated diene-based polymer having high linearity and improved compounding properties is provided. The modified conjugated diene-based polymer includes phosphor, sulfur and chlorine in specific amount ranges, and the degree of branching is controlled, and accordingly, if applied to a rubber composition, tensile strength and viscoelasticity may be excellent, and processability may be markedly improved.

9 Claims, No Drawings

MODIFIED CONJUGATED DIENE-BASED POLYMER AND RUBBER COMPOSITION COMPRISING SAME

CROSS-REFERENCE TO RELATED APPLICATIONS

The present application is a national stage entry under 35 U.S.C. § 371 of International Application No. PCT/KR2019/018258 filed on Dec. 20, 2019, which claims priority to Korean Patent Application No. 10-2018-0167687, filed on Dec. 21, 2018, the entire contents of which are incorporated herein by reference.

TECHNICAL FIELD

The present invention relates to a modified conjugated diene-based polymer having high processability and excellent compounding properties, and a rubber composition including same.

BACKGROUND ART

Recently, according to the growing attention on saving energy and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition including abrasion resistance, crack resistance or processability arise.

In order to solve such problems, a method of modifying the polymerization active moiety of a conjugated diene-based polymer which is obtained by anionic polymerization using an organolithium with a functional group which is capable of interacting with an inorganic filler, has been developed as a method for increasing the dispersibility of an inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative has been suggested.

However, if a rubber composition is prepared using the modified conjugated diene-based polymer which has been modified by the above-described methods, low heating properties may be secured, but the improving effects of the physical properties of a rubber composition such as abrasion resistance and processability were insufficient.

As another method, a method for improving processability and physical properties by modifying a living active terminal using a specific coupling agent or a modifier in a living polymer obtained by coordination polymerization using a catalyst including a lanthanide rare earth element compound has been developed.

For example, U.S. Pat. No. 5,557,784 discloses a method of introducing a branch structure by adding sulfur chloride after preparing 1,4-cis polybutadiene using a catalyst composed of the combination of a neodymium carboxylate compound, an alkylaluminum compound and a halogen-containing compound in a non-polar solvent and finishing the reaction using a reaction quenching agent and an antioxidant.

If sulfur chloride is added as a modifier as described above, a branch structure may be introduced, and thus, the linearity of a polymer may decrease, and Mooney viscosity may increase.

However, if the degree of branching of a polymer is controlled by applying sulfur chloride, etc. as a modifier as in the conventional technique, a modification reaction rate may be influenced by a catalyst system such that the reaction rate of the modifier is increased due to an aluminum component, etc. in the catalyst system including a lanthanide rare earth element compound, and the control of overall modification reaction rate is difficult, the control of the degree of branching, Mooney viscosity increasing ratio, etc. of a modified conjugated diene-based polymer finally prepared becomes difficult, and it is difficult to conduct a stable modification process. That is, if only sulfur chloride is added, the control of the degree of introducing a polymer branch is difficult due to the addition of sulfur chloride, and Mooney viscosity may be rapidly increased, processability during compounding may be largely degraded, or physical properties such as tensile properties and viscoelasticity properties may be deteriorated.

Accordingly, research on a modified conjugated diene-based polymer securing excellent degree of physical properties and compounding properties of the modified conjugated diene-based polymer prepared, and at the same time, improved processability, is required.

PRIOR ART DOCUMENT

Patent Document (Patent Document 1) U.S. Pat. No. 5,567,784

DISCLOSURE OF THE INVENTION

Technical Problem

The present invention has been devised to solve the above-mentioned problems of the conventional technique, and an object is to provide a modified conjugated diene-based polymer having high processability and excellent compounding properties.

Also, another object of the present invention is to provide a rubber composition including the modified conjugated diene-based polymer.

Technical Solution

To solve the above-described tasks, there is provided in the present invention a modified conjugated diene-based polymer including, based on a weight of the modified conjugated diene-based polymer, 240 to 470 ppm of phosphor (P); 490 to 900 ppm of sulfur (S); and 450 to 1100 ppm of chlorine (Cl).

In addition, the present invention provides a modified conjugated diene-based polymer containing the phosphor derived from a compound represented by the following Formula 1:

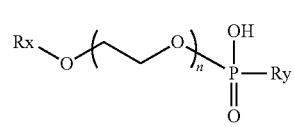

[Formula 1]

in Formula 1,

Rx may be an aliphatic hydrocarbonyl group of 1 to 30 carbon atoms, an alkylaryl group of 7 to 30 carbon atoms or an arylalkyl group of 7 to 30 carbon atoms, Ry may be a hydroxyl group (—OH), an aliphatic hydrocarbonyl group of 1 to 30 carbon atoms, an alkylaryl group of 7 to 30 carbon atoms or an arylalkyl group of 7 to 30 carbon atoms, and n may be an integer of 1 to 20.

Also, the present invention provides a modified conjugated diene-based polymer having a Mooney viscosity increasing ratio (%) of a polymer after modification to a Mooney viscosity of a polymer before modification of 50 to 200%, wherein the Mooney viscosity increasing ratio is computed by the following Mathematical Formula 1:

[Mathematical Formula 1]

$$\text{Mooney viscosity increasing ratio (\%)} = \frac{(\text{mooney viscosity at } 100°\text{ C. of polymer after modification} - \text{mooney viscosity at } 100°\text{ C. of polymer before modification})}{(\text{mooney viscosity at } 100°\text{ C. of polymer before modification})} \times 100$$

In addition, the present invention provides a rubber composition including the modified conjugated diene-based polymer.

Advantageous Effects

The modified conjugated diene-based polymer according to an embodiment of the present invention includes phosphor, sulfur and chlorine in specific amount ranges to control the degree of branching, and may control a Mooney viscosity increasing ratio before and after modification, thereby securing excellent degree of compounding properties such as tensile properties and viscoelasticity properties, and markedly improving processability.

BEST MODE FOR CARRYING OUT THE INVENTION

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

[Terms]

The term "preforming" used in the present disclosure means pre-polymerization in a catalyst composition for polymerizing a conjugated diene. Particularly, if a catalyst composition for polymerizing a conjugated diene, including a rare earth metal compound, an alkylating agent including an aluminum compound, and a halogen compound includes an aluminum hydride-based compound such as diisobutyl aluminum hydride (hereinafter, DIBAH) as the aluminum compound, a small amount of a monomer such as butadiene is included together to decrease the production possibility of diverse catalyst active species. Accordingly, the pre-polymerization of butadiene is performed in the catalyst composition for preparing a conjugated diene-based polymer prior to the polymerization reaction for preparing a conjugated diene-based polymer, and this process is referred to as preforming.

In addition, the term "premixing" used in the present disclosure means a homogenously mixed state of each of constituent components without being polymerized in a catalyst composition.

In addition, the term "catalyst composition" used in the present disclosure means a simple mixture of constituent components, diverse composites caused by physical or chemical attraction, or a chemical reaction product of constituent components.

In addition, the term "aliphatic hydrocarbonyl group" used in the present disclosure represents a substituent including hydrocarbon excluding aromatic hydrocarbon, and includes a saturated hydrocarbonyl group, an unsaturated hydrocarbonyl group, a linear hydrocarbonyl group and a cyclic hydrocarbonyl group.

The term "alkyl group" used in the present disclosure may mean a monovalent aliphatic saturated hydrocarbon and may include a linear alkyl group such as methyl, ethyl, propyl and butyl and a branched alkyl group such as isopropyl, sec-butyl, tert-butyl and neo-pentyl.

In addition, the term "alkylaryl group" used in the present disclosure may mean an aromatic hydrocarbon substituent in which an alkyl group is substituted at a monovalent aromatic hydrocarbon.

In addition, the term "arylalkyl group" used in the present disclosure may mean a substituent in which an aryl group which is an aromatic hydrocarbon is substituted at an alkyl group.

[Measurement Methods]

In the present invention, "stress/relaxation (—S/R) value" represents a stress change shown in response to the same amount of strain, and is measured using MV2000E (Monsanto Co.) at 100° C., in a rotor speed of 2±0.02 rpm using a large rotor. A polymer is stood at room temperature (23±5° C.) for 30 minutes or more, and 27±3 g of the polymer is collected and put in a die cavity, and then, a platen is operated, and Mooney viscosity is measured while applying torque. The —S/R value is obtained by measuring the gradient value of the Mooney viscosity change appearing during releasing the torque and representing as an absolute value.

In the present invention, "Mooney viscosity (MV)" is a measure judging the processability of a polymer, and if the Mooney viscosity is low to an appropriate level, it could be judged that flowability is good and processability is excellent. The unit is represented by Mooney Unit (MU), a ML (1+4) value is obtained at 100° C., where M represents Mooney, L represents a plate size, 1 represents 1 minute which is preheating time, and 4 represents reading a value after 4 minutes from rotor operation.

Particularly, the Mooney viscosity was measured while applying torque after standing a polymer at room temperature (23±5° C.) for 30 minutes or more, collecting 27±3 g of the polymer and putting in a die cavity, and then, operating platen by using MV2000E (Monsanto Co.) and using Large Rotor at 100° C. at a rotor speed of 2±0.02 rpm.

In the present invention, "molecular weight distribution (PDI; MWD, Mw/Mn)" represents the degree of the molecular weight distribution of a polymer and is calculated from a ratio (Mw/Mn) of a weight average molecular weight (Mw) to a number average molecular weight (Mn) of a polymer. The weight average molecular weight and the number average molecular weight were measured after dissolving a polymer in tetrahydrofuran (THF) for 30 minutes under 40° C. conditions and using gel permeation chromatography (GPC). In this case, two columns of PLgel Olexis and one column of PLgel mixed-C (trade names of Polymer Laboratories Co.) were used in combination, and newly replaced columns were all mixed bed type columns, and polystyrene was used as a GPC standard material.

The present invention provides a modified conjugated diene-based polymer including, based on the weight of the modified conjugated diene-based polymer, 240 to 470 ppm of phosphor (P); 490 to 900 ppm of sulfur (S); and 450 to 1100 ppm of chlorine (01).

The phosphor included in the modified conjugated diene-based polymer may be derived from a compound represented by the following Formula 1, and the compound represented by Formula 1 may be a compound included in an additive and/or a polymerization quenching agent for finishing polymerization reaction, which are added together with a modifier in a modification step for preparing the modified conjugated diene-based polymer:

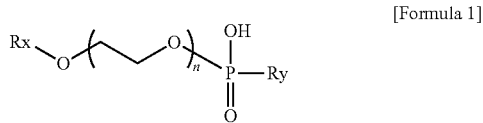

[Formula 1]

in Formula 1,

Rx may be an aliphatic hydrocarbonyl group of 1 to 30 carbon atoms, an alkylaryl group of 7 to 30 carbon atoms or an arylalkyl group of 7 to 30 carbon atoms, Ry may be a hydroxyl group (—OH), an aliphatic hydrocarbonyl group of 1 to 30 carbon atoms, an alkylaryl group of 7 to 30 carbon atoms or an arylalkyl group of 7 to 30 carbon atoms, and n may be an integer of 1 to 20.

Particularly, in Formula 1, Rx may be an alkyl group of 1 to 30 carbon atoms, an alkylaryl group of 7 to 30 carbon atoms or an arylalkyl group of 7 to 30 carbon atoms, more particularly, an alkyl group of 5 to 15 carbon atoms or an alkylaryl group of 10 to 20 carbon atoms, more particularly, an alkyl group of 8 to 12 carbon atoms or a nonylphenyl group. In addition, Ry may be a hydroxyl group (-OH), an alkyl group of 1 to 30 carbon atoms, an alkylaryl group of 7 to 30 carbon atoms or an arylalkyl group of 7 to 30 carbon atoms, more particularly, a hydroxyl group (—OH), an alkyl group of 5 to carbon atoms or an alkylaryl group of 10 to 20 carbon atoms, more particularly, a hydroxyl group (—OH), an alkyl group of 8 to 12 carbon atoms or a nonylphenyl group. In addition, n may be an integer of 1 to 10, more particularly, an integer of 1 to 5, an integer of 1 to 3, or an integer of 1 to 2.

In addition, the compound represented by Formula 1 according to an embodiment of the present invention may be a polyoxyethylene phosphate ester-based compound, for example, a polyoxyethylene alkyl(aryl)phosphate ester-based compound.

In addition, the phosphor included in the modified conjugated diene-based polymer may be derived from two or more different compounds satisfying Formula 1.

In addition, the chlorine and the sulfur included in the modified conjugated diene-based polymer may be derived from a modifier in a modification step during preparation, and for example, the modifier may be sulfur chloride.

More particularly, the modified conjugated diene-based polymer may include, based on the weight of the modified conjugated diene-based polymer, 250 to 400 ppm of phosphor (P), 550 to 850 ppm of sulfur (S); and 650 to 1000 ppm of chlorine (Cl), more particularly, 250 to 350 ppm of phosphor (P), 600 to 850 ppm of sulfur (S); and 700 to 950 ppm of chlorine (Cl).

With the amounts of the phosphor, chlorine and sulfur, the addition amounts of a modifier and an additive including the compound represented by Formula 1 added during modification may be anticipated, and the degree of branching of a polymer may be anticipated. Since the modified conjugated diene-based polymer according to an embodiment of the present invention is included in the above-described specific amount range, the degree of branching of a polymer may be controlled, and excellent degree of compounding properties such as tensile properties and viscoelasticity properties may be secured without degradation, and at the same time, excellent processability may be shown during compounding a rubber composition.

In addition, the conjugated diene-based polymer according to an embodiment of the present invention may have narrow molecular weight distribution of which molecular distribution (PDI: polydispersity) is 3.0 or less and which is the ratio (Mw/Mn) of a weight average molecular weight (Mw) and a number average molecular weight (Mn). If the PDI of the conjugated diene-based polymer is greater than 3.0, and the polymer is applied to a rubber composition, mechanical properties such as abrasion resistance and impact resistance may be deteriorated. More particularly, the molecular weight distribution of the conjugated diene-based polymer may be 2.0 to 3.0 in consideration of marked improving effects of the mechanical properties of the polymer according to the control of polydispersity.

Here, the molecular weight distribution may be calculated from the ratio (Mw/Mn) of the weight average molecular weight (Mw) to the number average molecular weight (Mn), and in this case, the number average molecular weight (Mn) is a common average of the molecular weights of individual polymers, which is obtained by measuring the molecular weights of n polymer molecules, obtaining the total of the molecular weights, and dividing the total by n, and the weight average molecular weight (Mw) represents molecular weight distribution of a polymer composition.

In addition, the conjugated diene-based polymer according to an embodiment of the present invention may satisfy the above-mentioned molecular weight distribution conditions and at the same time, may have a weight average molecular weight (Mw) of 300,000 g/mol to 1,200,000 g/mol, particularly 400,000 g/mol to 1,000,000 g/mol. In addition, the conjugated diene-based polymer according to an embodiment of the present invention may have a number average molecular weight (Mn) of 100,000 g/mol to 700,000 g/mol, particularly 120,000 g/mol to 500,000 g/mol. If applied to a rubber composition within the ranges, tensile properties may be excellent, processability may be good, and the workability of the rubber composition may be improved. Accordingly, mixing and kneading may become easy, and the balance between the mechanical properties and physical properties of a rubber composition may become excellent.

More particularly, if applied to a rubber composition, the conjugated diene-based polymer according to an embodiment of the present invention may preferably satisfy the weight average molecular weight and the number average molecular weight at the same time together with the molecular weight distribution considering the improving effects of mechanical properties, modulus and processability of a rubber composition with good balance. Particularly, the conjugated diene-based polymer may have the ratio (Mw/Mn) of the weight average molecular weight (Mw) and the number average molecular weight (Mn) of 3.0 or less, the weight average molecular weight (Mw) of 300,000 g/mol to 1,200,000 g/mol, and the number average molecular weight (Mn) of 100,000 g/mol to 700,000 g/mol, more particularly, the ratio (Mw/Mn) of the weight average molecular weight (Mw) and the number average molecular weight (Mn) of 2.0 to 3.0, the weight average molecular weight (Mw) of 400,000 g/mol to 1,000,000 g/mol, and the number average molecular weight (Mn) of 120,000 g/mol to 500,000 g/mol. As described above, more particularly, if the conjugated diene-based polymer according to an embodiment of the present invention satisfies the conditions of the molecular weight distribution together with the weight average molecular weight (Mw) and the number average molecular weight (Mn) and if applied to a rubber composition, effects of excellent tensile properties, viscoelasticity and processability on the rubber composition, and excellent balance among the physical properties may be achieved.

In addition, the modified conjugated diene-based polymer may have a Mooney viscosity (MV) at 100° C. of a polymer before modification of 10 to 90, particularly, 10 to 50, more particularly, 10 to 30. In addition, the Mooney viscosity (MV) at 100° C. of a polymer after modification may be 20 to 120, particularly, 30 to 110, more particularly, 40 to 80.

In the present invention, the Mooney viscosity may be measured by means of a Mooney viscometer, for example, MV2000E of Monsanto Co., using a large rotor at 100° C. at a rotor speed of 2±0.02 rpm. In this case, a specimen used is stood at room temperature (23±5° C.) for 30 minutes or more, and 27±3 g of the specimen is collected and put in a die cavity, and then, the Mooney viscosity may be measured by operating a platen.

From the increase of the Mooney viscosity through the modification process as described above, the introduction of a branch structure into the modified conjugated diene-based polymer may be confirmed. In this case, if the Mooney viscosity of a polymer after modification satisfies the above-described range, effects of further improving processability may be shown.

The modified conjugated diene-based polymer according to an embodiment of the present invention may have a Mooney viscosity increasing ratio (%) of a polymer after modification to a Mooney viscosity of a polymer before modification of 50 to 200%, and in view of preventing the degradation of tensile properties and viscoelasticity properties and markedly improving processability, preferably, 70 to 150%, more preferably, 90 to 130%. Here, the Mooney viscosity increasing ratio may be computed by the following Mathematical Formula 1:

and may prevent defects of rather deteriorating processability due to excessive increase of Mooney viscosity.

The modified conjugated diene-based polymer according to an embodiment of the present invention may show a standard deviation of the Mooney viscosity increasing ratio (%) of a polymer after modification with respect to the Mooney viscosity of a polymer before modification of 15% or less, preferably, 12% or less, more preferably, 10% or less. In this case, source data required for computing the standard deviation are on modified conjugated diene-based polymers prepared through repeating several times in the same conditions.

The modified conjugated diene-based polymer of the present invention shows the Mooney viscosity increasing ratio and standard deviation in the above-described ranges, and the Mooney viscosity increase before and after modification may be attained in a stable range, and uniform change of physical properties in the same modification conditions may be achieved. According to the formation of a modified conjugated diene-based polymer which may be easily reproduced, the control of the physical properties of the modified conjugated diene-based polymer may be easy.

In addition, the modified conjugated diene-based polymer may have a stress/relaxation (—S/R) value of 1.00 or less, 0.90 or less, 0.80 or less or 0.75 or less and lower limit without limitation but preferably, 0.10 or more, 0.40 or more, 0.50 or more or 0.60 or more. Through the —S/R value, the linearity of a polymer may be anticipated. For example, the small-S/R value means low linearity of a polymer, and on the contrary, the large value means high linearity of a polymer. If the linearity is too low and if applied to a rubber composition, compounding properties are degraded, and tensile properties and viscoelasticity properties may decrease, and if the linearity is too high, processability may decrease. Accordingly, in order to obtain excellent degrees of processability and compounding properties in balance, the linearity of a polymer is required to maintain a suitable degree, and since the modified conjugated diene-based polymer according to an embodiment of the present invention has the above-described —S/R value, high processability may be shown, and at the same time, compounding properties such as tensile properties and viscoelasticity properties may be excellent.

In addition, in the present invention, the modified conjugated diene-based polymer may be a neodymium catalyzed modified conjugated diene-based polymer, and the neodymium catalyzed modified conjugated diene-based polymer may represent a modified conjugated diene-based polymer prepared using a catalyst composition including a neodymium compound.

[Mathematical Formula 1]

$$\text{Mooney viscosity increasing ratio (\%)} = \frac{(\text{mooney viscosity at 100° C. of polymer after modification} - \text{mooney viscosity at 100° C. of polymer before modification})}{(\text{mooney viscosity at 100° C. of polymer before modification})} \times 100$$

The increase of the Mooney viscosity in the above-described range may show the improvement of processability, and if the above-described range is satisfied, mechanical properties such as tensile properties and viscoelasticity properties may be maintained to an excellent degree, and at the same time, processability may be improved. In addition, the increase of the Mooney viscosity in the above-described range may further assist the improvement of processability More particularly, the modified conjugated diene-based polymer may be a neodymium catalyzed modified conjugated diene-based polymer including a repeating unit derived from a 1,3-butadiene monomer.

In addition, the modified conjugated diene-based polymer according to an embodiment of the present invention may be a butadiene homopolymer such as polybutadiene, or a butadiene copolymer such as a butadiene-isoprene copolymer.

As particular examples, the conjugated diene-based polymer may include 80 to 100 wt % of a repeating unit derived from a 1,3-butadiene monomer, and selectively, 20 wt % or less of a repeating unit derived from other conjugated diene-based monomers which are copolymerizable with 1,3-butadiene, and within the ranges, effects of not reducing the 1,4-cis bond content in a polymer may be obtained. In this case, as the 1,3-butadiene monomer, 1,3-butadiene or the derivatives thereof including 2,3-dimethyl-1,3-butadiene, or 2-ethyl-1,3-butadiene may be used, and as the other conjugated diene-based monomers which are copolymerizable with 1,3-butadiene, 2-methyl-1,3-pentadiene, 1,3-pentadiene, 3-methyl-1,3-pentadiene, 4-methyl-1,3-pentadiene, 1,3-hexadiene or 2,4-hexadiene may be used, and any one or a mixture of two or more thereof may be used.

In addition, the modified conjugated diene-based polymer according to an embodiment of the present invention may be prepared according to the preparation method below.

According to an embodiment of the present invention, there is provided a method for preparing a modified conjugated diene-based polymer including: a step of polymerizing a conjugated diene-based monomer in the presence of a rare earth metal catalyst composition to prepare an active polymer (step 1); and a step of adding an additive including a compound represented by the following Formula 1 and sulfur chloride and modifying (step 2):

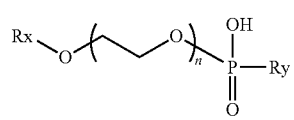

[Formula 1]

In Formula 1,

Rx may be an aliphatic hydrocarbonyl group of 1 to 30 carbon atoms, an alkylaryl group of 7 to 30 carbon atoms or an arylalkyl group of 7 to 30 carbon atoms, Ry may be a hydroxyl group (—OH), an aliphatic hydrocarbonyl group of 1 to 30 carbon atoms, an alkylaryl group of 7 to 30 carbon atoms or an arylalkyl group of 7 to 30 carbon atoms, and n may be an integer of 1 to 20.

Particularly, in Formula 1, Rx may be an alkyl group of 1 to 30 carbon atoms, an alkylaryl group of 7 to 30 carbon atoms or an arylalkyl group of 7 to 30 carbon atoms, more particularly, an alkyl group of 5 to 15 carbon atoms or an alkylaryl group of 10 to 20 carbon atoms, more particularly, an alkyl group of 8 to 12 carbon atoms or a nonylphenyl group. In addition, Ry may be a hydroxyl group (—OH), an alkyl group of 1 to 30 carbon atoms or an alkylaryl group of 7 to 30 carbon atoms, a hydroxyl group (—OH), an alkyl group of 5 to carbon atoms or an alkylaryl group of 10 to 20 carbon atoms, more particularly, a hydroxyl group (—OH), an alkyl group of 8 to 12 carbon atoms or a nonylphenyl group. In addition, n may be an integer of 1 to 10, more particularly, an integer of 1 to 5, an integer of 1 to 3, or an integer of 1 to 2.

In addition, the compound represented by Formula 1 according to an embodiment of the present invention may be a polyoxyethylene phosphate ester-based compound, for example, a polyoxyethylene alkyl(aryl)phosphate ester-based compound.

In addition, the additive including the compound represented by Formula 1 may be a mixture including two or more kinds of different compounds satisfying Formula 1.

For example, the additive including the compound represented by Formula 1 may be a mixture including two or more kinds of different compounds of Formula 1, where Rx is a nonylphenyl group or an alkyl group of 8 to 12 carbon atoms, Ry is a hydroxyl group, a nonylphenyl group or an alkyl group of 8 to 12 carbon atoms, and n is an integer of 1 or 2, and in this case, the molar ratio of the alkyl group of 8 to 12 carbon atoms and the nonylphenyl group included in the whole additive may be 70:30 to 90:10. In addition, the alkyl group of 8 to 12 carbon atoms may be more particularly, an alkyl group of 12 carbon atoms.

In the modified conjugated diene-based polymer of the present invention, since sulfur chloride is applied as a modifier in the step 2), chlorine and sulfur contents in the above-described ranges may be included. In addition, since an additive including the compound represented by Formula 1 is added in addition to sulfur chloride modifier, the phosphor content in the above-described range may be satisfied.

According to an embodiment of the present invention, the modification reactivity of a modifier may be controlled by adding an additive including the compound represented by Formula 1 in addition to the sulfur chloride modifier in the modification step, and accordingly, gelation phenomenon which may be shown due to rapid modification may be prevented and modification reproducibility may be markedly improved. In addition, since the introducing degree of a branch structure into a polymer may be controlled by controlling modification conditions such as the addition amounts and a modifier and an additive including the compound of Formula 1, the physical properties of the modified conjugated diene-based polymer, particularly, the changing ratio of the degree of branching shown by the decrease of a Mooney viscosity increasing ratio and a beta value, may be easily controlled. Particularly, if the rare earth metal catalyst system according to the present invention is applied, the reaction rate of sulfur chloride modifier is rapidly increased due to an aluminum compound in a catalyst composition, and it is hard to maintain stable reactivity. If stable reactivity is not maintained, it is hard to secure reaction reproducibility, and particularly, the introducing degree of a branch structure by the modifier may not be controlled, and accordingly, the degree of branching in a polymer may be significantly increased, or gelation phenomenon due to rapid modification may frequently arise. In this case, if the additive including the compound represented by Formula 1 is added together with the modifier according to an embodiment of the present invention, the aluminum compound in the catalyst composition may form a salt due to the compound represented by Formula 1, and thus, the reaction rate may be controlled, and the controlling degree of the reaction rate may be controlled by controlling the conditions such as the addition amounts of the modifier and the additive including the compound of Formula 1. Accordingly, the modification reactivity may be easily controlled, and the gel formation in a polymer may be prevented.

The step 1) according to an embodiment of the present invention is a step of polymerizing a conjugated diene-based monomer in the presence of a rare earth metal catalyst composition to prepare an active polymer, wherein the active polymer may represent an active polymer combined with an organometal.

The polymerization according to an embodiment of the present invention may be performed by radical polymerization, may be performed by various polymerization methods such as bulk polymerization, solution polymerization, suspension polymerization and emulsion polymerization, and may be performed by a batch method, a continuous method and a semi-continuous method. In a particular embodiment, the polymerization for preparing the conjugated diene-based polymer may be performed by injecting a conjugated diene-based monomer to the catalyst composition and reacting in an organic solvent.

Particularly, if the preparation is performed by the solution polymerization, the preparation of the conjugated diene polymer according to an embodiment of the present invention may be performed by injecting a conjugated diene-based monomer to the catalyst composition and reacting in a polymerization solvent.

As the conjugated diene-based monomer, any one used for preparing a common conjugated diene-based polymer may be used, without specific limitation. The conjugated diene-based monomer may particularly be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, etc., and any one or a mixture of two or more thereof may be used. More particularly, the conjugated diene-based monomer may be 1,3-butadiene.

In addition, other monomers which are capable of copolymerizing with the conjugated diene monomer may be further used in consideration of the physical properties of the conjugated diene polymer finally prepared. The other monomers may particularly include an aromatic vinyl monomer such as styrene, p-methylstyrene, α-methylstyrene, 1-vinylnaphthalene, 3-vinyltoluene, ethylvinylbenzene, divinylbenzene, 4-cyclohexylstyrene, and 2,4,6-trimethylstyrene, and any one or a mixture of two or more thereof may be used. The other monomers may be used in an amount of 20 wt % or less based on the total weight of the monomers used in the polymerization reaction.

In this case, the conjugated diene-based monomer is used not such that the total amount used for the preparation of a diene-based polymer is dissolved in a non-polar solvent, but such that a portion of the total amount is dissolved in a polymerization solvent and polymerized, and then injected in installments according to the polymerization conversion ratio in once or more times, particularly, in twice or more times, and more particularly, in twice to four times.

In addition, the solvent included during polymerization may be a hydrocarbon-based solvent, and the hydrocarbon-based solvent may be a non-polar solvent. Particularly, the hydrocarbon-based solvent may use one or more selected from the group consisting of aliphatic hydrocarbon-based solvents such as pentane, hexane, isopentane, heptane, octane and isooctane; cycloaliphatic hydrocarbon-based solvents such as cyclopentane, methylcyclopentane, cyclohexane, methylcyclohexane, and ethylcyclohexane; and aromatic hydrocarbon-based solvents such as benzene, toluene, ethylbenzene and xylene. As the particular examples of the hydrocarbon-based solvent, aliphatic hydrocarbon-based solvents such as hexane may be used. The concentration of the monomer used in the polymerization solvent is not specifically limited, but may be 3 wt % to 80 wt %, more particularly, 10 wt % to 30 wt %.

In addition, during the polymerization, additives may be further used, including a molecular weight controlling agent such as trimethylaluminum, diisobutylaluminum hydride, and trimethylsilane; a reaction quenching agent for finishing polymerization reaction such as polyoxyethylene glycol phosphate; and an antioxidant such as 2,6-di-t-butylparacresol. In addition, additives generally serving easy solution polymerization, particularly, additives such as a chelating agent, a dispersant, a pH controlling agent, a deoxidizer, and an oxygen scavenger may be selectively used.

The polymerization reaction may be performed at a temperature of 0° C. to 100° C., more particularly, 20° C. to 100° C.

In addition, the polymerization reaction may be performed in the above-mentioned temperature range for 5 minutes to 1 hour, particularly, 15 minutes to 1 hour until polymerization conversion rate reached 100%.

The rare earth metal catalyst composition according to an embodiment of the present invention may include (a) a rare earth metal compound, (b) a first alkylating agent, (c) a second alkylating agent and (d) a halogen compound and may further include a conjugated diene-based monomer.

Particularly, the rare earth metal compound, the first alkylating agent, the second alkylating agent, the halogen compound and the conjugated diene-based monomer may have a molar ratio of 1:(1 to 200):(1 to 80):(1 to 5):(0 to 100). More particularly, the rare earth metal compound, the first alkylating agent, the second alkylating agent, the halogen compound and the conjugated diene-based monomer may have a molar ratio of 1:(1 to 150):(1 to 50):(2 to 4):(5 to 30).

Particularly, the catalyst composition may be prepared by injecting a rare earth metal compound, a first alkylating agent, a second alkylating agent, a halogen compound, and selectively conjugated diene-based monomer in order to a hydrocarbon-based solvent and then, mixing.

In this case, in order to promote the production of a catalyst active species, the mixing process may be performed in a temperature range of −20° C. to 30° C., particularly, −10° C. to 10° C., and in this case, heat treatment may be performed at the same time to fulfill the above-mentioned temperature conditions.

More particularly, the catalyst composition may be prepared by mixing a rare earth metal compound, first and second alkylating agents and a solvent, firstly heat treating at a temperature of −20° C. to 30° C., adding a halogen compound to the resultant mixture thus obtained and secondly heat treating in a temperature range of −20° C. to 30° C.

In the catalyst composition prepared by the above-mentioned preparation method, a catalyst active species may be produced due to the interaction of constituent components. The catalyst composition thus prepared may further undergo an aging process in low temperature conditions.

In this case, the hydrocarbon-based solvent may be a non-polar solvent which has no reactivity with the constituent components of the catalyst composition. Particularly, the hydrocarbon-based solvent may use one or more selected from the group consisting of aliphatic hydrocarbon-based solvents such as pentane, hexane, isopentane, heptane, octane and isooctane; cycloaliphatic hydrocarbon-based solvents such as cyclopentane, methylcyclopentane, cyclohexane, methylcyclohexane, and ethylcyclohexane; and aromatic hydrocarbon-based solvents such as benzene, toluene, ethylbenzene and xylene. As the particular examples of the hydrocarbon-based solvent, aliphatic hydrocarbon-based solvents such as hexane may be used.

In addition, catalyst activity may be improved and further, the stabilizing effects of the conjugated diene-based polymer thus prepared may be attained by premixing a portion of the conjugated diene-based monomer used in the polymerization reaction with the catalyst composition and then using as a preforming catalyst composition type.

Particularly, the conjugated diene-based monomer may use any one commonly used for preparing a conjugated diene-based polymer without specific limitation. Particularly, the conjugated diene-based monomer may include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene, and any one among them or a mixture of two or more thereof may be used.

The catalyst composition according to an embodiment of the present invention will be explained in detail by each component.

(a) Rare Earth Metal Compound

The rare earth metal compound according to an embodiment of the present invention is activated by first and second alkylating agents and forms a catalyst active species for polymerizing a conjugated diene.

As the rare earth metal compound, any one commonly used for the preparation of a conjugated diene-based polymer may be used, without specific limitation. Particularly, the rare earth metal compound may be a compound including one or two or more rare earth metals having atomic numbers of 57 to 71 such as lanthanum, neodymium, cerium, gadolinium and praseodymium, and more particularly, a compound including one or two or more selected from the group consisting of neodymium, lanthanum and gadolinium, may be used.

In addition, the rare earth metal compound may be rare earth metal-containing carboxylates (for example, neodymium acetate, neodymium acrylate, neodymium methacrylate, neodymium acetate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium iodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic lanthanide rare earth metal compounds including one or more rare earth metal-carbon bonds (for example, $Cp_3Ln$, $Cp_2LnR'$, $Cp_2LnCl$, $CpLnCl_2$, $CpLn$ (cyclooctatetraene), $(C_5Me_5)_2LnR'$, $Ln(R')_3$, $Ln(allyl)_3$, $Ln(allyl)_2Cl$, etc., where Ln is a rare earth metal element, and R' is a monovalent organic group combined with a metal element through a carbon atom and may be a hydrocarbyl group), etc. and may include any one or a mixture of two or more thereof.

More particularly, the rare earth metal compound may be a neodymium compound represented by the following Formula 2:

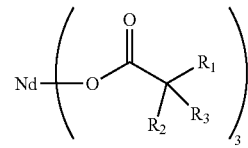

[Formula 2]

in Formula 2, $R_1$ to $R_3$ are each independently a hydrogen atom, or a linear or branched alkyl group of 1 to 12 carbon atoms.

More particularly, the rare earth metal compound may be a neodymium compound of Formula 2, where $R_1$ is a linear or branched alkyl group of 6 to 12 carbon atoms, $R_2$ and $R_3$ are each independently a hydrogen atom, or a linear or branched alkyl group of 2 to 6 carbon atoms, but $R_2$ and $R_3$ are not hydrogen atoms at the same time, more particularly, a neodymium compound of Formula 2, where $R_1$ is a linear or branched alkyl group of 6 to 8 carbon atoms, and $R_2$ and $R_3$ are each independently a linear or branched alkyl group of 2 to 6 carbon atoms.

As described above, if the neodymium compound of Formula 2 includes a carboxylate ligand including an alkyl group with various lengths of 2 or more carbon atoms at an a position as a substituent, steric change may be induced around a neodymium central metal to block tangling between compounds. As a result, oligomerization is suppressed and a conversion ratio into an active species is high. Such a neodymium compound has high solubility in a polymerization solvent, and the ratio of neodymium positioned in the central part, which has difficulty in conversion into a catalyst active species, is decreased to increase the conversion ratio into the catalyst active species.

More particularly, the rare earth metal compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of two or more thereof. In addition, in consideration of excellent solubility in a polymerization solvent without fear of oligomerization, excellent conversion ratio into a catalyst active species and consequent improving effect of catalyst activity, the neodymium compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of two or more thereof.

In addition, the rare earth metal compound may have a solubility of about 4 g or more per 6 g of a non-polar solvent at room temperature (23±5° C.). In the present invention, the solubility of the neodymium compound means the degree of clear dissolution without generating turbid phenomenon. Through showing such high solubility, excellent catalyst activity may be shown.

The rare earth metal compound may be used, for example, in an amount of 0.01 to 0.5 mmol, more particularly, 0.05 to 0.2 mmol per 100 g of a conjugated diene-based monomer used for polymerization, and within this range, catalyst activity is high, appropriate catalyst concentration is attained, and a separate demineralization process is not required.

The rare earth metal compound may be used as a reaction product type with a Lewis base. Due to the Lewis base, the reaction product may attain improved solubility of the rare earth metal compound in a solvent and may attain the effect of stable storage for a long time. The Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds, or monohydric or dihydric alcohols.

(b) First Alkylating Agent

The first alkylating agent according to an embodiment of the present invention may be an aluminoxane, and the aluminoxane may be prepared by reacting trihydrocarbyl aluminum-based compounds with water. Particularly, the aluminoxane may be a linear aluminoxane represented by the following Formula 3a or a circular aluminoxane represented by the following Formula 3b:

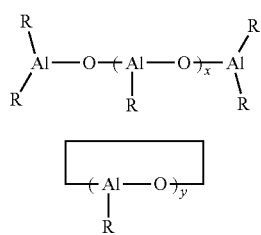

[Formula 3a]

[Formula 3b]

in Formulae 3a and 3b, R may be a monovalent organic group which is combined with an aluminum atom via a carbon atom and may be a hydrocarbyl group, x and y may be each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of at least two thereof may be used.

In addition, the modified methylaluminoxane may be obtained by substituting the methyl group of the methylaluminoxane with a modifier (R), particularly, a hydrocarbonyl group of 2 to 20 carbon atoms, and may particularly be a compound represented by the following Formula 4:

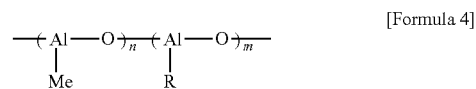

[Formula 4]

in Formula 4, R is the same as defined above, and m and n may be an integer of 2 or more. In addition, in Formula 4, Me means a methyl group.

Particularly, R in Formula 4 may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, more particularly, an alkyl group of 2 to 10 carbon atoms such as an ethyl group, an isobutyl group, a hexyl group and an octyl group, even more particularly, an isobutyl group.

More particularly, the modified methylaluminoxane may be obtained by substituting about 50 mol % to 90 mol % of the methyl group of the methylaluminoxane with the hydrocarbonyl group. If the amount of the hydrocarbonyl group substituted in the modified methylaluminoxane is in the above-mentioned range, alkylation may be accelerated, and catalyst activity may be increased.

Such modified methylaluminoxane may be prepared by a common method, particularly, prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

In addition, according to an embodiment of the present invention, the modified conjugated diene-based polymer prepared may be formed to have narrow molecular weight distribution, and accordingly, considering the improvement of the physical properties of a polymer, the first alkylating agent may be methylaluminoxane or modified methylaluminoxane.

(c) Second Alkylating Agent

The second alkylating agent according to an embodiment of the present invention may be hydrocarbylaluminum dihydride, and particularly, the second alkylating agent may be one or more selected from the group consisting of dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; ethylaluminum dihydride, n-propylaluminum dihydride, isopropylaluminum dihydride, n-butylaluminum dihydride, isobutylaluminum dihydride, and n-octylaluminum dihydride, or the like.

Meanwhile, in the catalyst composition according to an embodiment of the present invention, the alkylating agent may be an organometallic compound which is capable of delivering a hydrocarbyl group to another metal and plays the role of a co-catalyst.

In addition, the catalyst composition according to an embodiment of the present invention may further include a common alkylating agent commonly used as an alkylating agent during preparing a conjugated diene-based polymer in addition to the first and second alkylating agents as necessary. Such an alkylating agent may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; and alkylmagnesium compound such as diethylmagnesium, di-n-propylmagnesium, diisopropylmagnesium, dibutylmagnesium, dihexylmagnesium, diphenylmagnesium, and dibenzylmagnesium. Also, the organolithium compound may include an alkyllithium compound such as n-butyllithium.

(d) Halogen Compound

In the catalyst composition for polymerizing the conjugated diene according to an embodiment of the present invention, the kind of the halogen compound is not specifically limited, but any halogenating agents commonly used in the preparation of a diene-based polymer may be used without specific limitation.

Particularly, the halogen compound may be a diatomic halogen (simple substance), an interhalogen compound, hydrogen halide, organic halide, nonmetal halide, metal halide, or organometallic halide, etc., and any one or a mixture of two or more thereof may be used. Among them, in consideration of the improvement of catalyst activity and consequent improving effect of reactivity, the halogen compound may be any one selected from the group consisting of an organic halide, a metal halide and an organometallic halide, or a mixture of at least two thereof.

More particularly, the diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide or selenium tetraiodide.

In addition, the metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

In addition, the organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition for preparing the conjugated diene polymer according to an embodiment of the present invention may include a non-coordinating anion-containing compound or a non-coordinating anion precursor compound instead of the halogen compound or together with the halogen compound.

Particularly, in the compound containing a non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing a non-coordinating anion may include a counter cation such as a carbonium cation such as a triaryl carbonium cation; an ammonium cation such as a N,N-dialkyl anilinium cation, and a phosphonium cation together with the non-coordinating anion. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound ($BR_3$, where R is a strongly electron withdrawing aryl group such as a pentafluorophenyl group and a 3,5-bis(trifluoromethyl)phenyl group) may be used as a compound which is capable of forming a non-coordinating anion under reaction conditions.

In addition, according to an embodiment of the present invention, after the polymerization reaction, additives such as a reaction quenching agent for finishing polymerization reaction, such as polyoxyethylene glycol phosphate; and an antioxidant such as 2,6-di-t-butylparacresol may be further used. In addition, additives generally serving easy solution polymerization, particularly, additives such as a chelating agent, a dispersant, a pH controlling agent, a deoxidizer, and an oxygen scavenger may be selectively used.

In addition, in the polymerization reaction, preferably, the mixing of a compound having deactivating action such as oxygen, water and carbonic acid gas in a polymerization reaction system may be prevented so as not to deactivate the catalyst composition and the polymer.

As a result of such polymerization reaction, an active polymer including an organometal moiety activated from a catalyst composition including the rare earth metal compound, more particularly, a neodymium catalyzed conjugated diene-based polymer including a 1,3-butadiene monomer unit may be produced, and the conjugated diene-based polymer thus prepared may have pseudo-living properties.

According to an embodiment of the present invention, a polymerization quenching agent may be added to finish polymerization after the step 1), and the polymerization quenching agent may use any polymerization quenching agents used in a process for polymerizing a conjugated diene-based polymer without limitation, particularly, a phosphate ester-based polymerization quenching agent may be used. More particularly, the same composition as the additive including the compound represented by Formula 1 may be used.

In the present invention, the polymerization quenching agent added after the step 1) may be added in 0.01 to 0.4 parts by weight based on 100 parts by weight of the conjugated diene-based monomer.

The step 2) according to an embodiment of the present invention is a step for modifying the polymerized active polymer and may be a step for modifying by adding an additive including the compound represented by Formula 1 and sulfur chloride.

According to an embodiment of the present invention, the step 2) may be performed by adding a composition including a compound represented by Formula 1 and sulfur chloride after quenching polymerization by adding the polymerization quenching agent after the step 1).

In addition, according to an embodiment of the present invention, in the additive including the compound represented by Formula 1, if any compound represented by Formula 1 is a compound represented by Formula 1 where the Ry substituent is an aliphatic hydrocarbonyl group, an alkylaryl group or an arylalkyl group, a compound represented by Formula 1 where Ry is a hydroxyl group may be included together.

Here, the modification may be performed by solution reaction or solid phase reaction, particularly, solution reaction. In another embodiment, the modification reaction may be performed using a batch-type reactor or using an apparatus such as a multi-step continuous reactor and an inline mixer.

In another embodiment, the modification reaction may be performed under the same temperature and pressure conditions as common polymerization reaction, particularly, at a temperature of 20° C. to 100° C. Within this range, the viscosity of a polymer may not increase, and the activated terminal of a polymer may not be deactivated.

The sulfur chloride according to an embodiment of the present invention may be used as a modifier for modifying an active polymer, and may use sulfur chloride compounds such as sulfur monochloride ($S_2Cl_2$), sulfur dichloride ($SCl_2$) and sulfur tetrachloride ($SCl_4$), without limitation, but preferably, the sulfur chloride of the present invention may be sulfur monochloride ($S_2Cl_2$) considering easy introduction of a branch structure into a conjugated diene-based polymer and the increase of Mooney viscosity step by step.

In the present invention, the Mooney viscosity may be increased step by step by introducing a branch structure into a polymer using sulfur chloride as a modifier. Accordingly, compounding properties such as processability may be improved and at the same time, by adding the compound represented by Formula 1 together with sulfur chloride, the reactivity between remaining aluminum component and modifier in a catalyst composition may be controlled and modification reactivity may be controlled. Accordingly, stable modification reaction may be performed, and modification reproducibility may be improved. Since the modification reproducibility is excellent, the changing degree of physical properties according to modification conditions, specifically, Mooney viscosity increasing ratio may be anticipated, and through controlling the modification conditions, the change of the physical properties of a polymer may be easily controlled. Also, by introducing a branch structure, the linearity of a polymer may be controlled, and the processability and compounding properties of a modified conjugated diene-based polymer may be improved to an excellent degree.

In addition, in the step 2) in the present invention, the compound represented by Formula 1 may be added in 0.01 to 0.35 parts by weight based on 100 parts by weight of the conjugated diene-based monomer, and may preferably be added in 0.01 to 0.3 parts by weight, more preferably, 0.01 to 0.2 parts by weight considering the further improvement of modification reproducibility by easily controlling modification reactivity.

In addition, according to an embodiment of the present invention, in the step 2), the sulfur chloride and the compound represented by Formula 1 may be added in a weight ratio of 1:0.1 to 1:2, and may preferably be added in a weight ratio of 1:0.1 to 1:1 considering securing the improving effects of excellent physical properties through modification and markedly improving modification reproducibility without degrading modification reaction efficiency.

In addition, according to an embodiment of the present invention, a step of adding an antioxidant may be further included after the step 2). This is a treatment process for preventing the oxidation of a modified conjugated diene-based polymer finally prepared and corresponds to a post-treatment step for stabilizing and recovering a modified conjugated diene-based polymer.

The antioxidant according to an embodiment of the present invention may use any antioxidants used in a polymerization process of a modified conjugated diene-based polymer without limitation and may use a phenol-based antioxidant, a phosphor-based antioxidant and a sulfur-based antioxidant. As the phenol-based antioxidant, Irganox 1010 (pentaerythritoltetrakis(3-(3,5-di-tert-butyl-4-hydroxyphenyl)propionate), manufactured by BASF Co.), Irganox 1076 (octadecyl-3-(3,5-ditert-butyl-4-hydroxyphenyl)propionate, manufactured by BASF Co.), Irganox 1330 (3,3',3",5,5',5"-hexa-tert-butyl-a,a',a"-(mesitylene-2,4,6-triyl)tri-p-cresol, manufactured by BASF Co.), Irganox 3114 (1,3,5-tris(3,5-di-tert-butyl-4-hydroxybenzyl)-1,3,5-triazine-2,4,6(1H,3H,5H)-trion, manufactured by BASF Co.), Irganox 3790 (1,3,5-tris((4-tert-butyl-3-hydroxy-2,6-xylyl)methyl)-1,3,5-triazine-2,4,6(1H,3H,5H)-trion, manufactured by BASF Co.), Irganox 1035 (thiodiethylenebis (3-(3, 5-di-tert-butyl-4-hydroxyphenyl)propionate), manufactured by BASF Co.), Irganox 1135 (benzenepropanoic acid, 3,5-bis(1,1-dimethylethyl)-4-hydroxy, C7-C9 branched alkyl ester, manufactured by BASF Co.), Irganox 1520 (4,6-bis (octylthiomethyl)-o-cresol, manufactured by BASF Co.), Irganox 3125 (manufactured by BASF Co.), Irganox 565 (2,4-bis(n-octylthio)-6-(4-hydroxy 3',5'-di-tert-butylanilino)-1,3,5-triazine, manufactured by BASF Co.), Adecastave AO-80 (3,9-bis(2-(3-(3-tert-butyl-4-hydroxy-5-methylphenyl)propionyloxy)-1,1-dimethylethyl)-2,4,8,10-tetraoxaspiro(5,5)undecane, manufactured by ADEKA Co.), Sumilizer BHT (manufactured by Sumitomo Chemical Co.), Sumilizer GA-80 (manufactured by Sumitomo Chemical Co.), Sumilizer GS (manufactured by Sumitomo Chemical Co.), Cyanox 1790 (manufactured by Cytec Co.), Vitamin E (manufactured by Eisai Co.), etc., may be used. As the phosphor-based antioxidant, Irgafos 168 (tris(2,4-di-tert-butylphenyl)phosphite, manufactured by BASF Co.), Irgafos 12 (tris(2-((2,4,8,10-tetra-tert-butyldibenzo[d,f][1,3,2]dioxaphosphine-6-yl)oxy)ethyl)amine, manufactured by BASF Co.), Irgafos 38 (bis(2,4-bis(1,1-dimethylethyl)-6-methylphenyl)ethylesterphosphorous acid, manufactured by BASF Co.), Adecastave 329K (manufactured by ADEKA Co.), Adecastave PEP36 (manufactured by ADEKA Co.), Adecastave PEP-8 (manufactured by ADEKA Co.), Sandstab P-EPQ (manufactured by Clariant Co.), Weston 618 (manufactured by GE Co.), Weston 619G (manufactured by GE Co.), Ultranox 626 (manufactured by GE Co.), Sumilizer GP (6-(3-(3-tert-butyl-4-hydroxy-5-methylphenyl) propoxy)-2,4,8,10-tetratert-butyldibenz[d,f][1.3.2]dioxaphosphephine)(manufactured by Sumitomo Chemical Co.), etc. may be used. As the sulfur-based antioxidant, for example, dialkylthiodipropionate compound such as dilauryl thiodipropionate, dimyristyl and distearyl, β-alkylmercaptopropionate ester compound of polyol such as tetrakis [methylene(3-dodecylthio)propionate]methane, etc., may be used. In addition, in order to improve the antioxidation effect of the modified conjugated diene-based polymer and improve the stability of a polymer, Irganox 1520 (4,6-bis (octylthiomethyl)-o-cresol) may be preferably used.

Further, the present invention provides a rubber composition including the conjugated diene-based polymer, and a molded article manufactured from the rubber composition.

The rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the conjugated diene-based polymer is less than 0.1 wt %, the improving effects of the abrasion resistance and crack resistance of a molded article manufactured using the rubber composition, for example, a tire, may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based copolymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be a silica-based filler, carbon black or a combination thereof. Particularly, the filler may be carbon black.

The carbon black-based filler is not specifically limited but may have a nitrogen adsorption specific surface area of, for example, 20 $m^2$/g to 250 $m^2$/g (measured based on N2SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2$/g, the processability of the rubber composition may be deteriorated, and if the nitrogen adsorption specific surface area of the carbon black is less than 20 $m^2$/g, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, N2SA) of 120 $m^2$/g to 180 $m^2$/g, and cetyl trimethyl ammonium bromide (CTAB) absorption specific surface area of 100 $m^2$/g to 200 $m^2$/g. If the nitrogen absorption specific surface area of the silica is less than 120 $m^2$/g, the reinforcing performance due to silica may be deteriorated, and if the nitrogen absorption specific surface area of the silica is greater than 180 m$^2$/g, the processability of the rubber composition may be deteriorated. In addition, if the CTAB absorption specific surface area of the silica is less than 100 m$^2$/g, the reinforcing performance by the silica filler may be deteriorated, and if the CTAB absorption specific surface area of the silica is greater than 200 m$^2$/g, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives commonly used in rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded article manufactured using the rubber composition may include tires or tire treads.

Hereinafter, the present invention will be explained in more detail referring to embodiments. However, the embodiments below are only for illustrating the present invention, and the scope of the present invention is not limited thereto.

Example 1

Under nitrogen conditions, to a 10 L reactor, 4.173 kg of hexane and 500 g of 1,3-butadiene were injected, and the temperature was elevated to 70° C. A catalyst composition prepared by reacting 0.40 mmol of neodymium versatate (NdV), 16.5 mmol of diisobutylaluminum hydride (DIBAH), 0.96 mmol of diethylaluminum chloride, a hexane solution of 8.0 mmol of 1,3-butadiene and a toluene solution of 40.0 mmol of methylaluminoxane (MAO) was added thereto, in an amount of 0.35±0.15 mmol NdV/100 g BD, and polymerization was performed until the conversion ratio of 1,3-butadiene to polybutadiene was about 100%. After that, a hexane solution including 1.0 g of a polyoxyethylene glycol phosphate ester-based additive (manufactured by Il Chil Chemical Co., trade name: HPSS-81) including the compound corresponding to Formula 1 was injected as a polymerization quenching agent to finish polymerization. After completing the polymerization reaction of 1,3-butadiene, a hexane solution including 1.0 g of sulfur chloride and 0.5 g of a polyoxyethylene glycol phosphate ester-based additive (manufactured by Il Chil Chemical Co., trade name: HPSS-81) including the compound corresponding to Formula 1 was added to the polymerization solution, followed by performing modification reaction at 70° C. for 30 minutes. Then, a hexane solution including 1.0 g of Irganox 1520 (manufactured by BASF Co.) was added. The resultant polymer thus obtained was put in hot water heated with steam, stirred to remove solvents, and hot roll dried to removed remaining solvents and water to prepare a modifier conjugated diene polymer.

Examples 2 to 4

Modified conjugated diene polymers were prepared by performing the same method described in Example 1 except for changing the addition amounts of the sulfur chloride and the polyoxyethylene phosphate ester-based additive (manufactured by Il Chil Chemical Co., trade name: HPSS-81) as in the conditions in Table 1 below in the step of performing modification reaction in Example 1.

Comparative Example 1

An unmodified conjugated diene polymer was prepared by performing the same method described in Example 1 except for not adding the sulfur chloride modifier and the polyoxyethylene phosphate ester-based additive in Example 1.

Comparative Examples 2 to 6

Modified conjugated diene polymers were prepared by performing the same method described in Example 1 except for changing the addition amounts of the sulfur chloride and the polyoxyethylene phosphate ester-based additive (manufactured by Il Chil Chemical Co., trade name: HPSS-81) as in the conditions in Table 1 below in the step of performing modification reaction in Example 1.

Experimental Example 1

With respect to each polymer prepared in the Examples and Comparative Examples, Mooney viscosity (MV), —S/R value and phosphor, sulfur and chlorine contents in a modified conjugated diene-based polymer were measured by the methods below.

1) Mooney Viscosity (MV, ML1+4, @100° C.) (MU) and Stress/Relaxation (—S/R) Value The Mooney viscosity (ML1+4, @100° C.) (MU) was measured by means of MV2000E of Monsanto Co. using a large rotor at 100° C. at a rotor speed of 2±0.02 rpm conditions for each polymer. In this case, a specimen used was stood at room temperature (23±5° C.) for 30 minutes or more, and 27±3 g of the specimen was collected and put in a die cavity, and then, a platen was operated, and the Mooney viscosity was measured while applying torque. In addition, —S/R value (absolute value) was obtained by measuring the gradient value of Mooney viscosity change shown while releasing torque.

Meanwhile, a specimen for measuring the Mooney viscosity of a polymer before and after modification, —S/R and a t80 value was obtained as follows. 1 g of a polymerization quenching agent was injected at a point where a polymerization conversion ratio reached 100% and then stirred for 10 minutes. Then, 500 g of a polymer mixture in which about 50 g of a polymer was dissolved was taken from a reactor, then sufficiently mixed with a mixed solution of 200 ml of distilled water and 0.1 g of $IR_{1520}$, and roll-mill treated.

2) Measurement of Phosphor, Chlorine and Sulfur Contents

The phosphor content was measured using ICP-OES (Optima 7300DV) of Perkinelmer Co. In this case, a polymer specimen used was pre-treated as follows. 0.1 g of a specimen was accurately measured in a vial. The to the vial containing the specimen, 2 ml of an aqueous 96% concentrated sulfuric acid solution was added. Then, the specimen was heated for carbonization. In a hot state, 0.02 g of an aqueous 70% concentrated nitric acid solution was added thereto. This process was repeated to change the color of a solution to pale yellow. The specimen was heated until the material in the vial remained to a height of 2 mm, and then, the heating was stopped, followed by cooling to room temperature. Then, 1 ml of concentrated nitric acid was added again, and 0.02 g of hydrogen peroxide (concentration 31%) was added for decomposition. 1000 mg/kg of an internal standard material and 200 µl of Sc (scandium) were added, and the resulting product was diluted with 20 ml of pure water.

In addition, the chlorine and sulfur contents were measured according to the conditions below using a combustion IC (AQF-2100H) of Mitsubishi Co.

a) Combustion temperature: inlet temperature 900° C., outlet temperature 1000° C.

b) Gas flow rate: Ar gas 200 mL/min, 02 gas 400 mL/min c) Humidification rate: 0.23 mL/min, internal standard material ($PO4^{3-}$): 20 mg/kg d) Absorption fluid ($H_2O_2$): 900 mg/kg, absorption fluid volume: 5 mL, diluent volume of final absorption fluid: 10 mL e) Column: IonPac AS18 (4×250 mm)

f) Eluent kind: KOH (30.5 mM), eluent flow rate: 1 mL/min g) Detector: Suppressed Conductivity Detector, SRS Current: 76 mA h) Injection volume: 100 µL, isocratic/gradient conditions: isocratic i) About 0.03 g of a polymer specimen was accurately measured on a specimen boat, and a comburent ($WO_3$) was added.

j) The specimen was measured using a combustion IC.

3) Weight Average Molecular Weight (Mw), Number Average Molecular Weight (Mn) and Molecular Weight Distribution (PDI; MWD)

Each polymer was dissolved in tetrahydrofuran (THF) for 30 minutes under 40° C. conditions, and the resultant solution was loaded on gel permeation chromatography (GPC) and flown to measure each molecular weight, and the molecular weight distribution was computed from the ratio of the weight average molecular weight and the number average molecular weight. In this case, two columns of PLgel Olexis and one column of PLgel mixed-C (trade name of Polymer Laboratories Co.) were used in combination. Also, newly replaced columns were all mixed bed type columns, and polystyrene was used as a GPC standard material.

TABLE 1

| Division | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Sulfur chloride injection amount (phm) | | 0.2 | 0.1 | 0.15 | 0.2 | — | 0.01 | 0.2 | 0.2 | 0.2 | 0.4 |
| Polyoxyethylene phosphate ester-based additive injection amount* (phm) | | 0.1 | 0.1 | 0.1 | 0.15 | — | 0.1 | 0.4 | 0.05 | — | 0.1 |
| Component measurement | Phosphor content (ppm) | 260 | 255 | 281 | 298 | 155 | 275 | 660 | 210 | 220 | 280 |
| | Sulfur content (ppm) | 800 | 650 | 720 | 821 | 340 | 351 | 735 | 750 | 730 | 965 |
| | Chlorine content (ppm) | 925 | 726 | 862 | 892 | 175 | 298 | 991 | 957 | 1025 | 1253 |
| Viscosity properties | Mooney viscosity before modification (MV) | 22 | 24 | 22 | 26 | 30 | 29 | 28 | 23 | 22 | 25 |
| | Mooney viscosity after modification (MV) | 47 | 49 | 48 | 52 | — | 47 | 50 | 75 | 72 | 82 |
| | MV increasing ratio (%) | 114 | 104 | 118 | 100 | — | 62 | 79 | 226 | 227 | 228 |
| Molecular weight | Mn (×10⁵) | 2.11 | 2.15 | 2.20 | 2.21 | 1.97 | 2.01 | 2.05 | 2.34 | 2.40 | 2.32 |
| | Mw (×10⁵) | 6.29 | 6.13 | 6.31 | 6.41 | 5.01 | 5.50 | 5.54 | 7.30 | 7.39 | 7.31 |
| | MWD | 2.98 | 2.85 | 2.87 | 2.90 | 2.54 | 2.74 | 2.70 | 3.12 | 3.08 | 3.15 |
| -S/R value after modification | | 0.662 | 0.703 | 0.687 | 0.625 | 0.956 | 0.856 | 0.835 | 0.442 | 0.458 | 0.426 |

*The injection amount of the polyoxyethylene phosphate ester-based additive represents an injection amount injected together with sulfur chloride in a modification step.

As shown in Table 1, Examples 1 to 4, of which phosphor, sulfur and chlorine contents are included in the ranges of the present invention satisfied the Mooney viscosity increasing ratio of 50 to 200%, different from Comparative Examples 1 to 6, of which contents deviated from the ranges.

Experimental Example 2

Rubber compositions and rubber specimens were prepared using the modified conjugated diene polymers prepared in the Examples and the modified conjugated diene polymers and the unmodified conjugated diene polymer prepared in the Comparative Examples, and processability properties were measured by the method below. The results are shown in Table 2 below.

Particularly, each rubber composition was prepared by compounding 100 parts by weight of each polymer with 70 parts by weight of carbon black, 22.5 parts by weight of a process oil, 2 parts by weight of an antiaging agent (TMDQ), 3 parts by weight of zinc white (ZnO), and 2 parts by weight of stearic acid. Then, to each rubber composition, 2 parts by weight of sulfur, 2 parts by weight of a vulcanization accelerator (CZ) and 0.5 parts by weight of a vulcanization accelerator (DPG) were added and gently mixed at 50° C. for 1.5 minutes in 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

1) Processability

The processability was obtained by measuring Mooney viscosity (FMB, final master batch) using the vulcanized compounding product and confirming through a Mooney viscosity difference (ΔMV). Here, the Mooney viscosity difference represents difference between the Mooney viscosity of each polymer shown in Table 1 after modification and the Mooney viscosity of the compounding materials (ΔMV, FMB-RP), and the smaller difference of the Mooney viscosity represents excellent processability.

Particularly, the Mooney viscosity (ML1+4, @100° C.) (MU) was measured using each vulcanized compounding product thus prepared. The Mooney viscosity (MV) was measured by means of MV2000E of Monsanto Co. using a large rotor at 100° C. at a rotor speed of 2±0.02 rpm conditions for each polymer. In this case, a specimen used was stood at room temperature (23±5° C.) for 30 minutes or more, and 27±3 g of the specimen was collected and put in a die cavity, and then, a platen was operated and the Mooney viscosity (FMB) was measured while applying torque.

2) Tensile Strength, 300% Modulus and Elongation

After vulcanizing each rubber composition at 150° C. for t90 minutes, the tensile strength, 300% modulus when elongated by 300% (M-300%) and elongation when broken of the vulcanized product were measured according to ASTM D412.

In the present invention, with respect to each measured value, improved degree was indexed (index value) by setting the measured value of Comparative Example 1 to 100. In this case, it means that all the tensile strength, 300% modulus and elongation are good if the index values are high.

3) Viscoelasticity Properties (Tan δ @0° C. and Tan δ @60° C.)

Tan δ properties were measured as viscoelasticity coefficient (Tan δ) at 0° C. and 60° C. at a frequency of 10 Hz, prestrain of 3%, and dynamic strain of 3% by using DMTS 500N of Gabo Co., Germany.

In the present invention, the improved degree of each measured value was indexed (index value) by setting the measured value of Comparative Example 1 to 100. In this case, it means that with the increase of the viscoelasticity coefficient indexed value at 0° C. which is a low temperature, the wet surface resistance is good, and it means that with the increase of the viscoelasticity coefficient indexed value at 60° C. which is a high temperature, hysteresis loss is small, and low rolling resistance, that is, a fuel consumption ratio is excellent.

TABLE 2

|  | Division | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Processability | Mooney viscosity (FMB) | 61 | 65 | 65 | 67 | 53 | 70 | 73 | 98 | 96 | 105 |
|  | Mooney viscosity difference | 14 | 16 | 14 | 15 | 23 | 23 | 23 | 23 | 24 | 23 |
| Tensile properties (index) | M-300% | 106 | 107 | 104 | 105 | 100 | 100 | 99 | 93 | 95 | 94 |
|  | Tensile strength | 101 | 102 | 104 | 106 | 100 | 100 | 98 | 102 | 101 | 103 |
|  | Elongation | 102 | 103 | 101 | 104 | 100 | 102 | 97 | 105 | 100 | 103 |
| Viscoelasticity properties (index) | Tanδ at 0° C. | 101 | 100 | 102 | 101 | 100 | 95 | 94 | 95 | 90 | 91 |
|  | Tanδ at 60° C. | 106 | 105 | 104 | 105 | 100 | 99 | 96 | 94 | 93 | 92 |

As shown in Table 2, it could be confirmed that Examples 1 to 4, of which phosphor, sulfur and chlorine contents are included in the ranges of the present invention showed excellent tensile properties, viscoelasticity properties, small Mooney viscosity of a rubber composition, and a small Mooney viscosity difference of a modified polymer when compared with Comparative Examples 1 to 6, of which contents deviated from the ranges, and from the results, it could be confirmed that the Examples showed better processability than the Comparative Examples.

The invention claimed is:

1. A modified conjugated diene-based polymer, comprising:
   240 to 470 ppm of phosphor (P) based on a weight of the modified conjugated diene-based polymer;
   490 to 900 ppm of sulfur (S) based on a weight of the modified conjugated diene-based polymer; and
   450 to 1100 ppm of chlorine (Cl) based on a weight of the modified conjugated diene-based polymer.

2. The modified conjugated diene-based polymer according to claim 1, comprising:
   250 to 400 ppm of phosphor (P) based on the weight of the modified conjugated diene-based polymer;
   550 to 850 ppm of sulfur (S) based on the weight of the modified conjugated diene-based polymer; and
   650 to 1000 ppm of chlorine (Cl) based on the weight of the modified conjugated diene-based polymer.

3. The modified conjugated diene-based polymer according to claim 1, wherein the phosphor is derived from a compound represented by the following Formula 1:

[Formula 1]

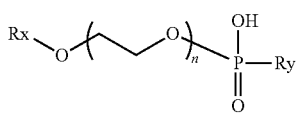

wherein,

Rx is an aliphatic hydrocarbonyl group of 1 to 30 carbon atoms, an alkylaryl group of 7 to 30 carbon atoms or an arylalkyl group of 7 to 30 carbon atoms, Ry is a hydroxyl group (—OH), an aliphatic hydrocarbonyl group of 1 to 30 carbon atoms, an alkylaryl group of 7 to 30 carbon atoms or an arylalkyl group of 7 to 30 carbon atoms, and n is an integer of 1 to 20.

4. The modified conjugated diene-based polymer according to claim 3, wherein the phosphor is derived from two or more compounds represented by Formula 1.

5. The modified conjugated diene-based polymer according to claim 1, wherein the modified conjugated diene-based polymer is a neodymium catalyzed modified conjugated diene-based polymer.

6. The modified conjugated diene-based polymer according to claim 1, wherein the chlorine and the sulfur are derived from sulfur chloride.

7. The modified conjugated diene-based polymer according to claim 1, wherein the modified conjugated diene-based polymer has a Mooney viscosity, measured by using a rotor at 100° C. at a rotor speed of 2±0.02 rpm, of 20 to 120.

8. The modified conjugated diene-based polymer according to claim 1, wherein the modified conjugated diene-based polymer has a Mooney viscosity increasing ratio (%) of a polymer after modification to a Mooney viscosity of a polymer before modification of 50 to 200%, wherein the Mooney viscosity increasing ratio is computed by the following Mathematical Formula 1:

$$\text{Mooney viscosity increasing ratio (\%)} = \frac{(\text{mooney viscosity at } 100° \text{ C. of polymer after modification} - \text{mooney viscosity at } 100° \text{ C. of polymer before modification})}{(\text{mooney viscosity at } 100° \text{ C. of polymer before modification})} \times 100$$

[Mathematical Formula 1]

9. A rubber composition comprising the modified conjugated diene-based polymer of claim 1.

* * * * *